(12) United States Patent
Zhao

(10) Patent No.: US 8,275,593 B2
(45) Date of Patent: Sep. 25, 2012

(54) RESERVOIR MODELING METHOD

(75) Inventor: Gang Zhao, Regina (CA)

(73) Assignee: University of Regina, Regina SK (CA)

( * ) Notice: Subject to any disclaimer, the term of this patent is extended or adjusted under 35 U.S.C. 154(b) by 257 days.

(21) Appl. No.: 12/837,683

(22) Filed: Jul. 16, 2010

(65) Prior Publication Data

US 2011/0015909 A1    Jan. 20, 2011

Related U.S. Application Data

(60) Provisional application No. 61/226,197, filed on Jul. 16, 2009.

(51) Int. Cl.
*G06G 7/48* (2006.01)
(52) U.S. Cl. .......................................... 703/10
(58) Field of Classification Search ...................... 703/10
See application file for complete search history.

(56) References Cited

U.S. PATENT DOCUMENTS

| 5,740,342 | A | * | 4/1998 | Kocberber | ................. 345/420 |
| 2004/0193960 | A1 | * | 9/2004 | Vassilev | ..................... 714/38 |
| 2009/0138245 | A1 | * | 5/2009 | Appleyard | ..................... 703/2 |

* cited by examiner

*Primary Examiner* — David Silver
(74) *Attorney, Agent, or Firm* — Stevens & Showalter LLP

(57) ABSTRACT

A method for providing a three-dimensional model of a reservoir includes: dividing the reservoir into grid elements, each of the grid elements being delimited by boundary surfaces, storing reservoir properties associated with each of the grid elements in a computer memory, dividing boundary surfaces of each of the grid elements into sub-surfaces, calculating fluxes across each of the sub-surfaces of each of the grid elements, the fluxes being calculated based on a reservoir type and applying the fluxes to each of the grid elements to provide pressure and production status throughout the reservoir.

18 Claims, 12 Drawing Sheets

RESERVOIR MODELING METHOD

CROSS-REFERENCE TO RELATED APPLICATIONS

The present disclosure claims priority from U.S. Patent Application No. 61/226,197, filed Jul. 16, 2009 the contents of which is hereby incorporated by reference.

TECHNICAL FIELD

The present disclosure relates to computer based modeling of natural resources, and in particular to modelling subsurface reservoirs.

BACKGROUND

Well-test analysis has long been used as a valuable tool in characterizing reservoirs using transient pressure vs. time behavior and forecasting reservoir production. In most prior art well-test models, the reservoir is idealized as a homogeneous single or dual porosity system with simple reservoir and well geometry. This is done to facilitate generation of analytical solutions to the reservoir problem and is not applicable for heterogeneous reservoirs with complex geometry and complex well bore geometry. Examples of heterogeneous reservoirs with complex geometry include: reservoirs with anticline structure, naturally fractured reservoirs, fluvial reservoirs with channel and splay, multilayer heterogeneous reservoirs, reservoirs having sealing and/or conductive faults and reservoirs having partially sealing faults. Examples of complex wellbore geometry include: horizontal wells, multilateral wells and multistage fractured wells.

Accordingly, methods that enable improved reservoir modelling remain highly desirable.

SUMMARY

In accordance with an aspect of the present disclosure there is provided a method implemented in a computer processor for providing a three-dimensional model of a reservoir stored in memory as a reservoir data model, the memory coupled to the processor, the method comprising: dividing the reservoir data model into a plurality of three dimensional $N_x \times N_y \times N_z$ grid elements, each of the grid elements being delimited by boundary surfaces; storing reservoir properties associated with each of the plurality of grid elements of the divided reservoir data model in the memory; dividing boundary surfaces of each of the plurality of grid elements into sub-surfaces; determining fluxes across each of the sub-surfaces of each of the plurality of grid elements in the Laplace domain, the fluxes being calculated based on a type of reservoir of the reservoir model; and applying the determined fluxes to each of the grid elements to provide pressure and production status throughout the reservoir data model.

In accordance with another aspect of the present disclosure there is provided a computer readable memory containing instructions for generating a three-dimensional model of a reservoir as a reservoir data model, the instructions when executed by a processor performing the method of dividing the reservoir data model into a plurality of three dimensional $N_x \times N_y \times N_z$ grid elements, each of the grid elements being delimited by boundary surfaces; storing reservoir properties associated with each of the plurality of grid elements of the divided reservoir data model in the memory; dividing boundary surfaces of each of the plurality of grid elements into sub-surfaces; determining fluxes across each of the sub-surfaces of each of the plurality of grid elements in the Laplace domain, the fluxes being calculated based on a type of reservoir of the reservoir model; and applying the determined fluxes to each of the grid elements to provide pressure and production status throughout the reservoir data model.

In accordance with yet another aspect of the present disclosure there is provided a system for generating a three-dimensional model of a reservoir as a reservoir data model, the system comprising: a processor; a memory containing instructions, which when executed by the processor perform: dividing the reservoir data model into a plurality of three dimensional $N_x \times N_y \times N_z$ grid elements, each of the grid elements being delimited by boundary surfaces; storing reservoir properties associated with each of the plurality of grid elements of the divided reservoir data model in the memory; dividing boundary surfaces of each of the plurality of grid elements into sub-surfaces; determining fluxes across each of the sub-surfaces of each of the plurality of grid elements in the Laplace domain, the fluxes being calculated based on a type of reservoir of the reservoir model; and applying the determined fluxes to each of the grid elements to provide pressure and production status throughout the reservoir data model.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Embodiments are described below, by way of example only, with reference to FIGS. 1 to 12.

Figure 1:
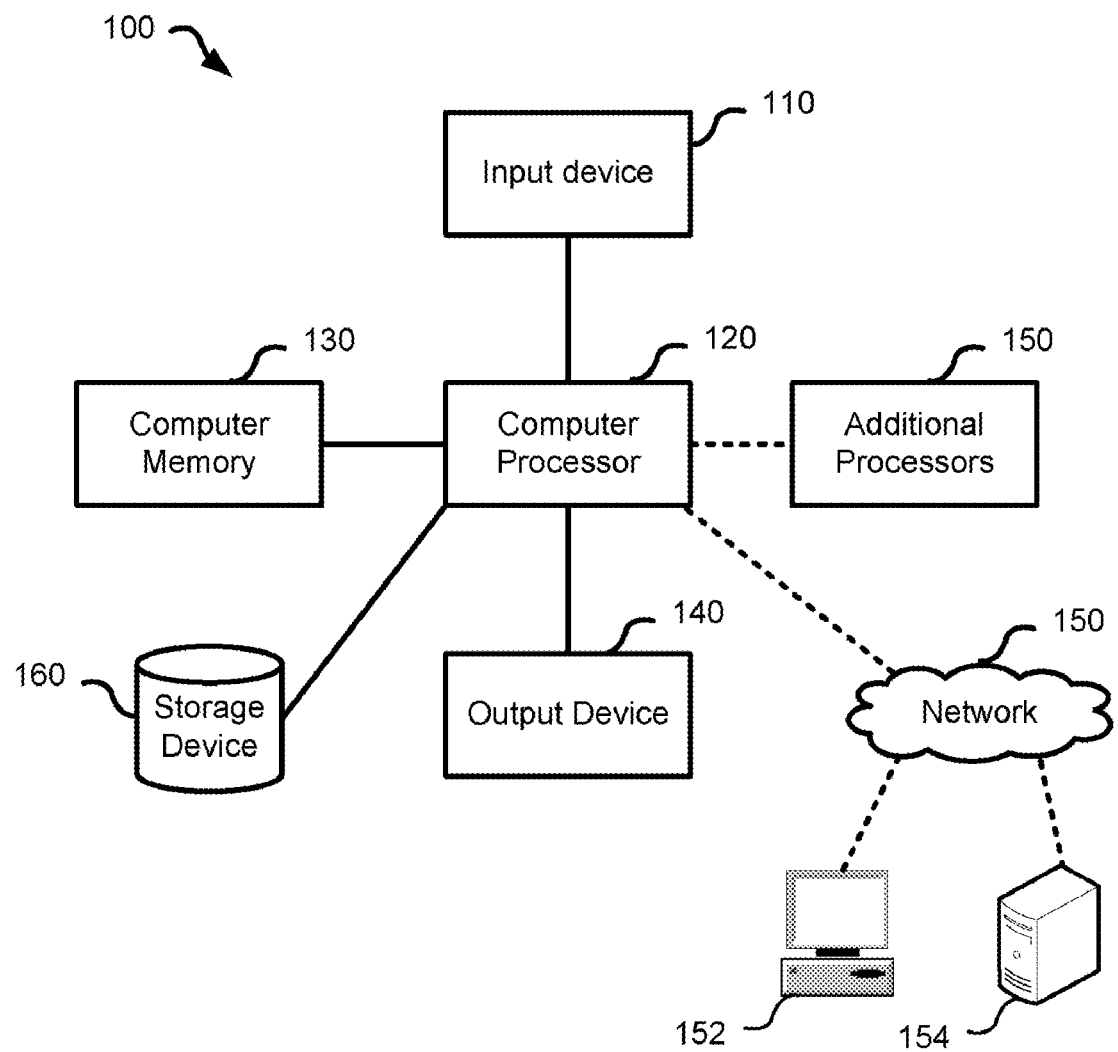
FIG. 1 is a schematic diagram of a reservoir modeling apparatus according to an embodiment.
Figure 2:
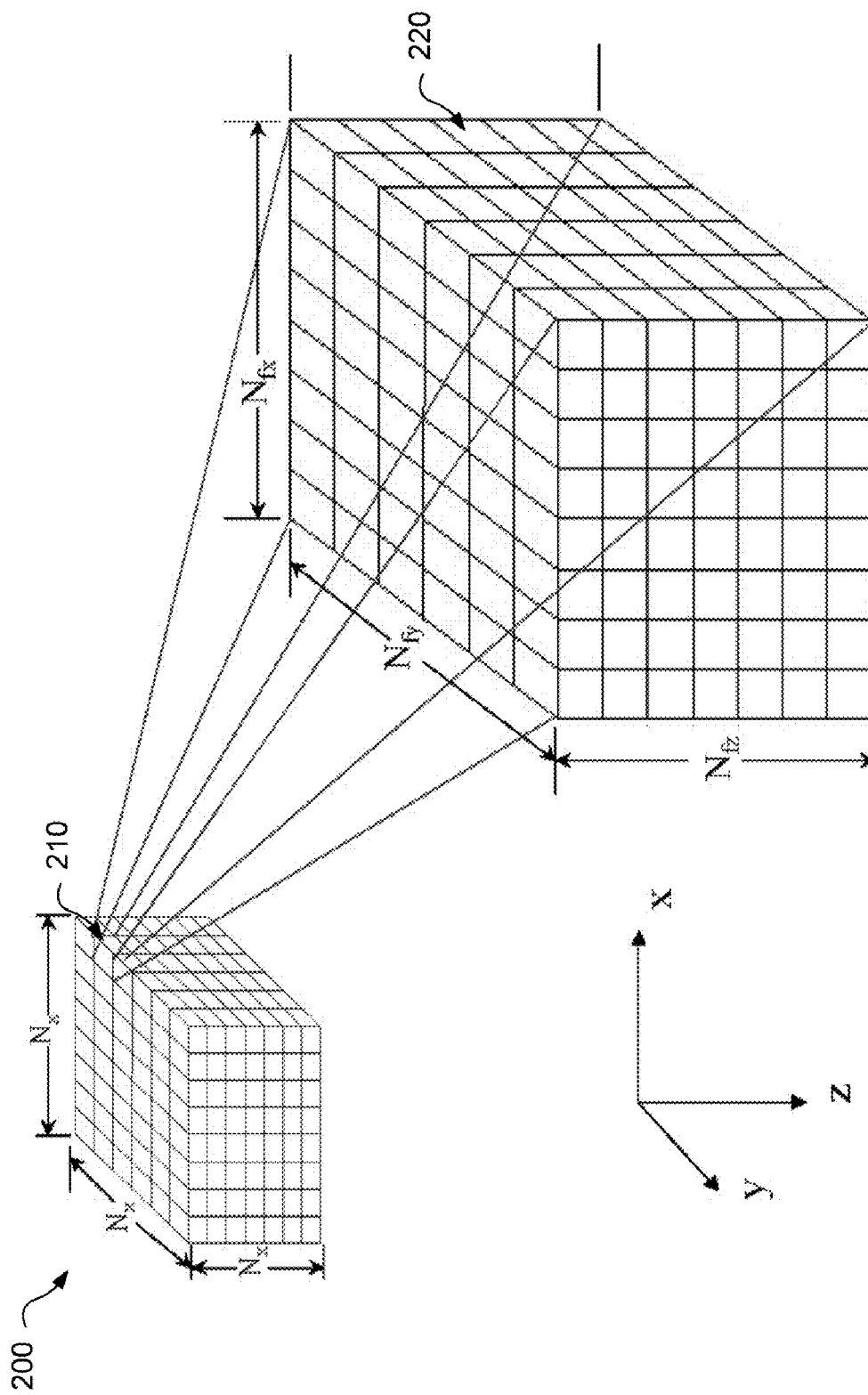
FIG. 2 is a schematic diagram showing a reservoir represented by grid elements having boundary surfaces that are discretized into sub-surfaces.

Referring to FIG. 1, a reservoir modeling apparatus 100 is generally shown. The apparatus 100 includes an input device 110, such as a keyboard. mouse or touch screen, for example, a computer processor 120, a computer memory 130 and an output device 140, such as a computer screen or printer, for example. The input device 110, computer memory 130 and output device 140 are in communication with the computer processor 120. Additional processors 150 are optionally provided in communication with the computer processor 120 to provide additional processing power, where applicable. The computer processor 120 executes software that is stored in the computer memory 130. The software is provided to generate and output a mathematical model of a reservoir based on data that is input to the computer processor 120. The output that is generated may be in the form of: graphs, tables, description or reservoir geological property realizations, which include permeability and porosity throughout the reservoir, for example. The reservoir data and output results may be stored locally on storage device 160, or may be provided too or accessed via a network 150 through computer systems The discretization of the reservoir into grid elements is performed by the computer processor 120. Referring to FIG. 2, an example of a reservoir 200 to be modeled is generally shown. As shown, the reservoir to be modeled is divided into a plurality of grid elements 210 and the boundary surface of each grid element is further divided into a plurality of sub-surfaces 220. The number of gird elements selected to represent each reservoir to be modeled is determined based on the amount of reservoir property information that is available. For applications in which reservoir property information is abundant, a larger number of grid elements is generally provided. As will be appreciated by a person skilled in the art, the greater the number of grid elements, the more accurate the output.

The reservoir properties are input to the computer processor 120 via the input device 110 and stored in computer memory 16. In one embodiment, an image of a three dimensional grid having multiple grid elements representing the reservoir to be modeled is displayed and the user populates a form that is generated when each grid element is selected. In another embodiment, data is transferred from a computer readable memory, such storage device 160, or networked server storage 154, to the computer memory 130. The data may be provided in any type of data file including a database or a spreadsheet, for example.

The reservoir properties include geological information collected from geophysics core/rock sample study and field analogues. Field analogue data includes data from reservoirs that are similar to the reservoir to be modeled and is used when data for the particular reservoir to be modeled is not available. Reservoir properties include: permeability, porosity, viscosity, compressibility and thickness, length, width and position of rock formations in reservoir. Fluid pressure, volume and temperature relationship (PVT) and other fluid properties are measured through lab testing following fluid sampling from a wellbore. PVT and other measurements may alternatively be obtained through in-situ downhole measurement.

In addition to assigning reservoir properties to grid elements, additional features may be incorporated in order to more accurately model a reservoir. Features such as reservoir heterogeneity, natural fractures, faults, tight reservoir streaks, vugs, continuous shale bodies, discontinuous shale bodies and boundary conditions of each grid element may also be modeled. Heterogeneity features along grid element faces can also be incorporated. Such features include natural fractures, sealing/conductive and continuous/discontinuous faults. Wellbore trajectories may also be integrated within the grid elements corresponding to wellbore locations.

Figure 3:
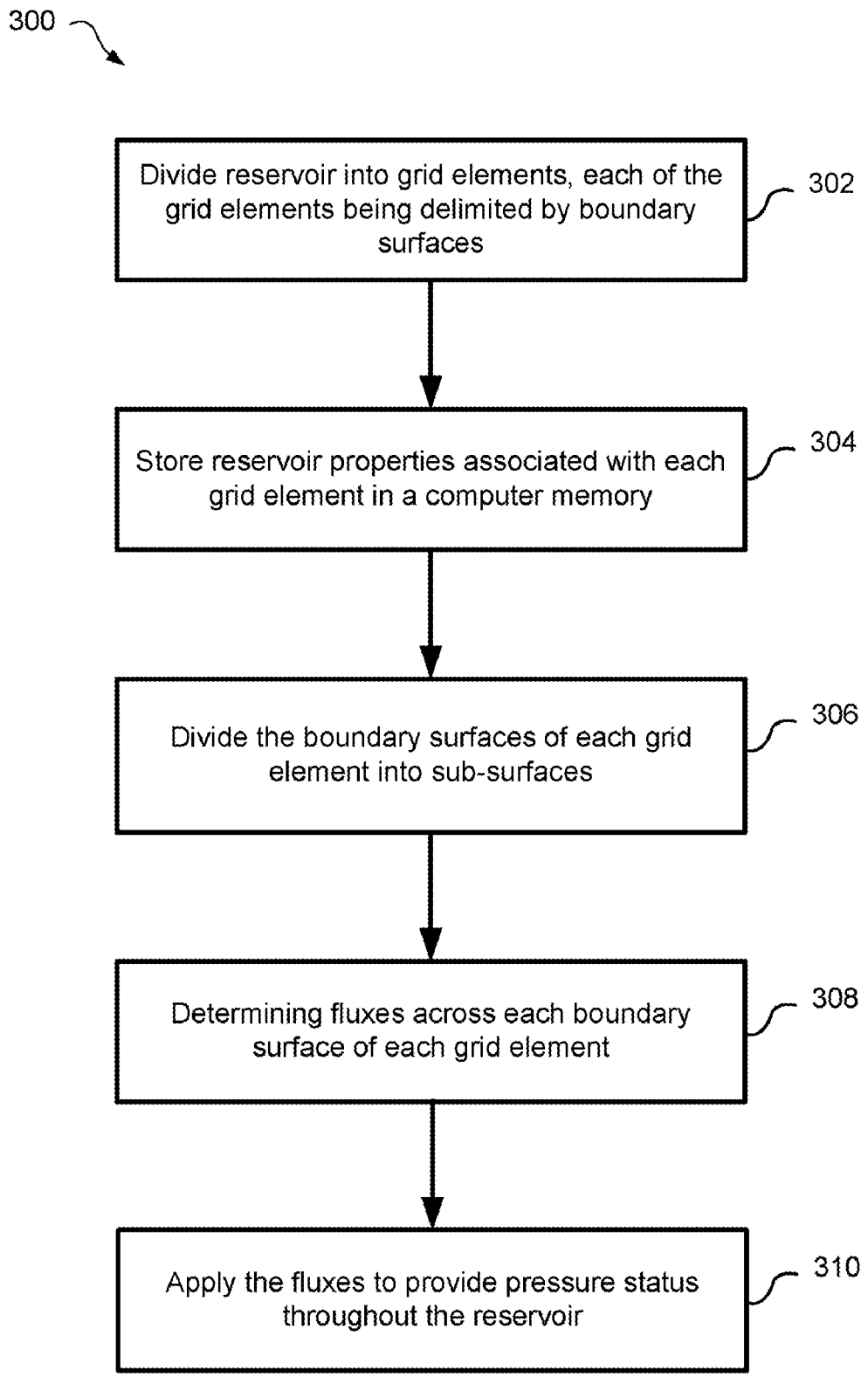
FIG. 3 is a flow chart depicting a method for modeling a reservoir according to an embodiment.
Figure 10:
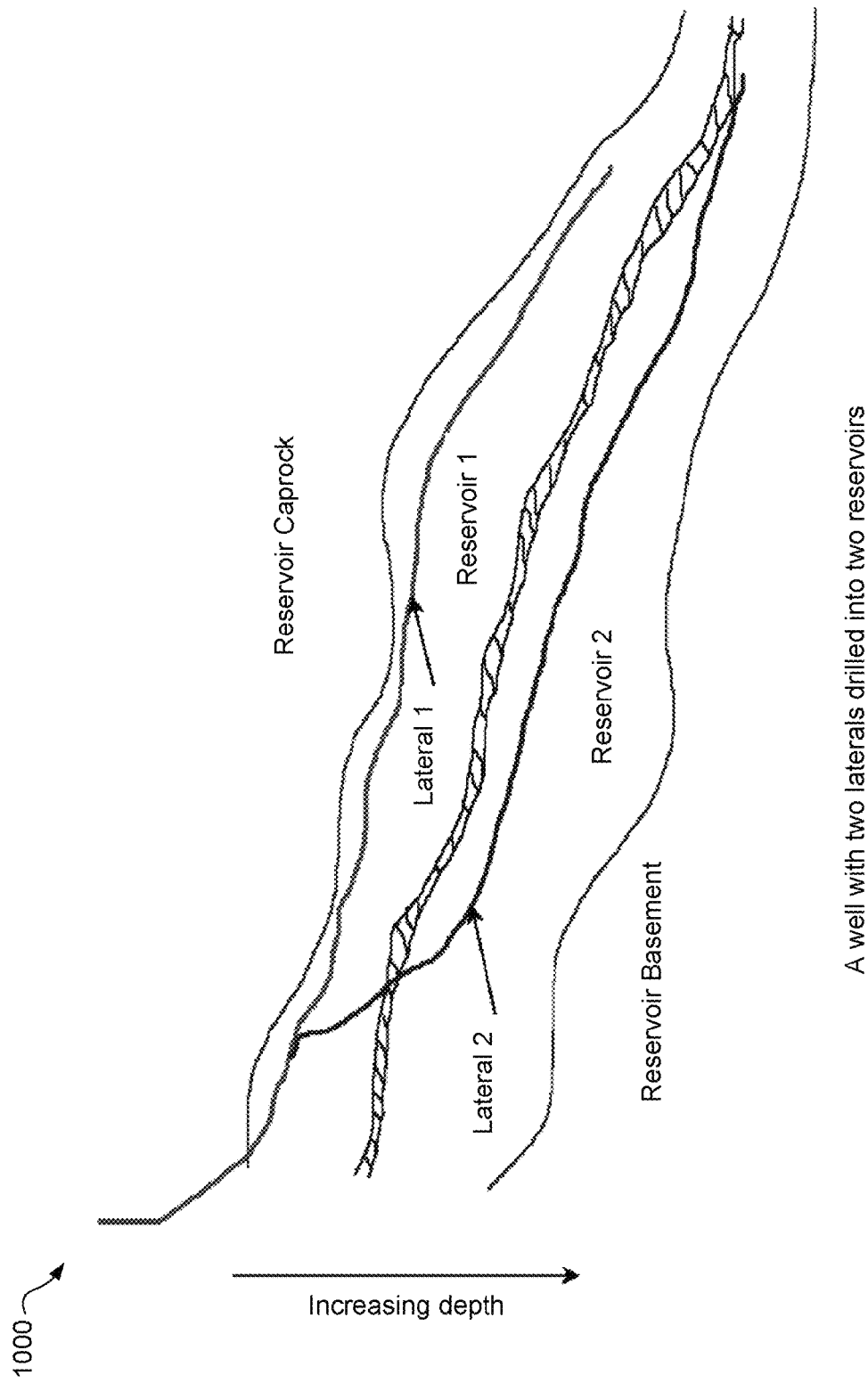
FIG. 10 is a schematic diagram showing a multilateral well.

As shown in FIG. 3, a method for modeling a reservoir 300 is provided. A reservoir, defined by one or more of parameters such as reservoir rock permeability, porosity, rock and fluid compressibility, viscosity, reservoir rock geometry, fracture systems contained inside, fault parameters, temperature, pressure, etc., is divided into grid elements. The resolutions of the division of the reservoir into grid elements is constrained by processing power and memory. However, other constraints placed on the resolution of the grid are the availability of the reservoir information for certain area/range of a reservoir, the geometry of the reservoir again, how much reservoir heterogeneity to be captured, and the main reservoir features to be simulated, like fracture or major permeability contrasts., etc. The grid elements delimited by boundary surfaces (302). The reservoir properties associated with each grid element are stored in computer memory 130. The boundary surfaces of each grid element are divided into sub-surfaces (306). Fluxes across each of the sub-surfaces is determined (308) by an accurate computation in Laplace domain based on a reservoir type such as an infinite reservoir, a semi-infinite reservoir, a reservoir having no-flow boundaries, a constant pressure reservoir and a reservoir having constant rate boundaries. The fluxes are applied to provide pressure status throughout the reservoir (310). The method makes it possible to model heterogeneous complex reservoirs as well as wellbore trajectories that can be added separately depending on the type of well. For example, a well in 2D and 3D will be simply expressed in a format of (x,y) and (x,y,z), respectively. As shown in FIG. 10, a horizontal well will need its trajectory dataset from drilling report, basically.

Figure 4:
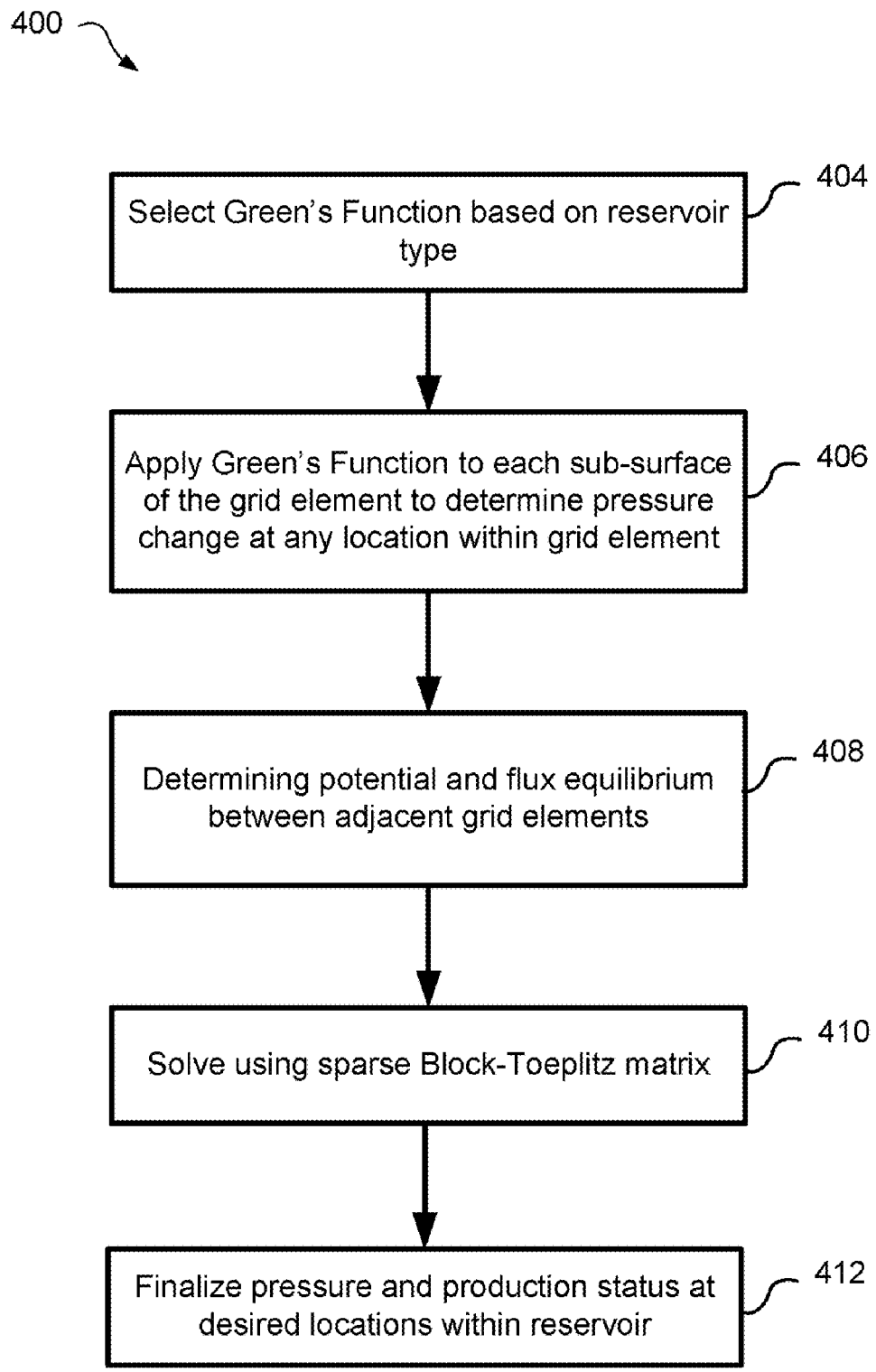
FIG. 4 is a flow chart depicting the method of calculating fluxes across each boundary surface.

Referring to FIG. 4, fluxes across each of the boundary surfaces are determined for each sub-surface as provided in FIG. 2 (208). A flux kernel function generated by Green function method along the grid/sub-grid boundary is selected based on reservoir type is selected (404). Reservoir types are defined by reservoir initial and boundary conditions. Examples of reservoir types include: infinite and semi-infinite reservoirs, reservoirs having no-flow boundaries, constant pressure reservoirs and reservoirs having constant rate boundaries. Other reservoir types and corresponding flux kernel functions are also possible. The flux kernel function equations are generated using Green's function (GF) method based on the reservoir boundary conditions of the grid element. A source/sink function method may alternatively be used. The source/sink function method is a direct application of Green's function method and both methods are generally known in the art. The two methods are the same theoretically. The flux kernel function equations are applied to each sub-surface of each boundary surface to determine the potential status at any location on the reservoir model (406) for each grid element. Potential status refers to the potential change at the centre of each sub-surface that is caused by a source/sink. Potential and flux equilibriums are applied to the common surfaces between grid elements in order to generate equations to generate a linear system between adjacent grid elements (408). The linear system is solved in Laplace domain using sparse Block-Toeplitz matrix as the main feature to determine fluxes of boundary surfaces and flux profiles along well trajectories (410). The wellbore pressure and well production rate at selected wellbore locations is finalized within the reservoir using a corresponding wellbore condition (412), such as constant rate production process, constant bottom hole pressure (BHP) production process, or variable rate process, based upon fluxes of sub-surfaces and a flux profile along the wellbore trajectory. Wellbore conditions include constant rate and constant wellbore pressure.

Figure 5:
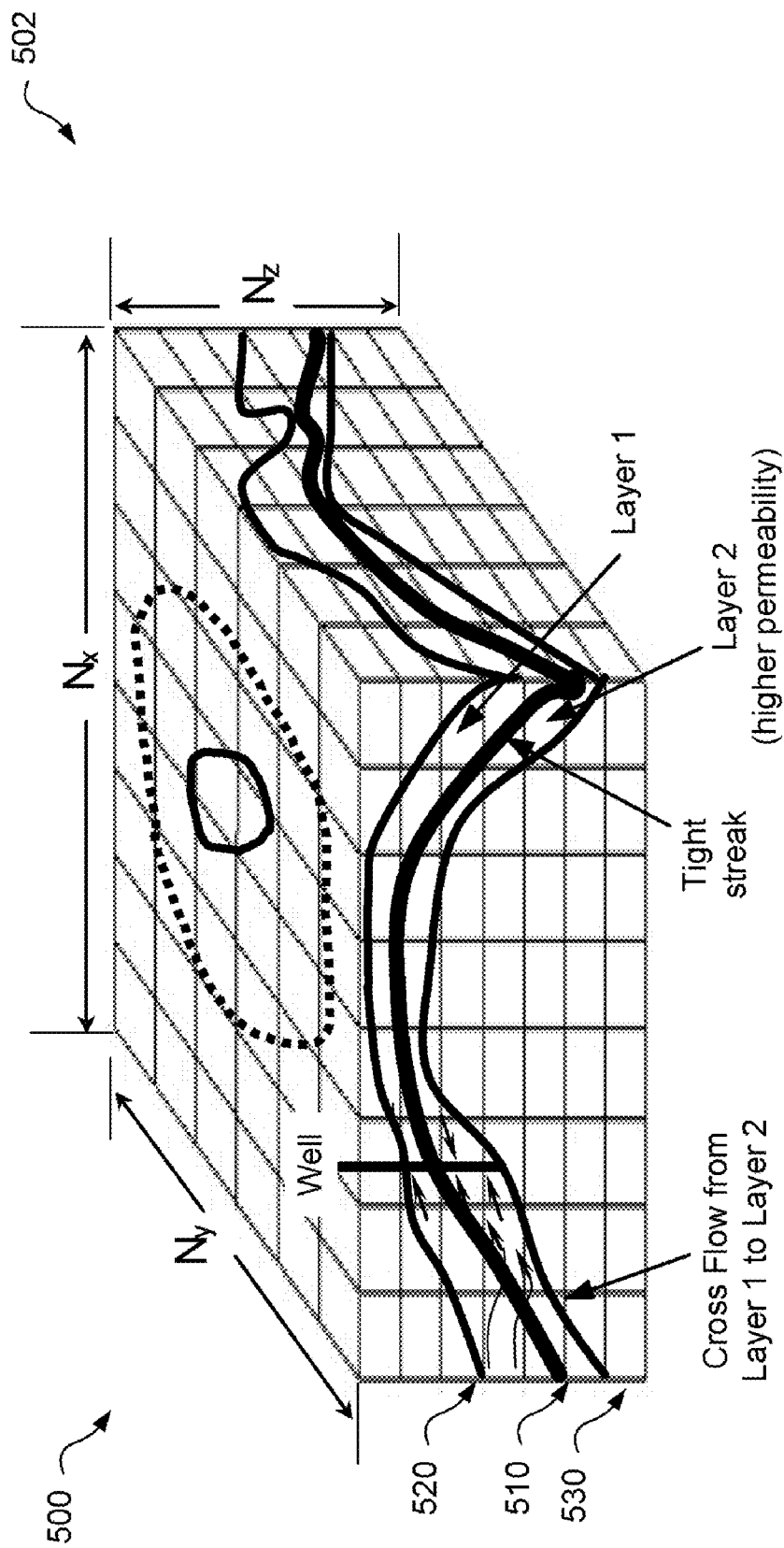
FIG. 5 is a schematic diagram showing a heterogeneous reservoir having complex geometry divided into grid elements.

In one example, the method for modeling a reservoir 500 is applied to a reservoir having cross flow, as shown in FIG. 5. In this example, the reservoir consists of three layers with different permeabilities. The middle tight streak 510 is treated as a layer with very low permeability. In order to model this type of reservoir, the reservoir is first discretized into a three-dimensional grid 502 having a user-selected number of grid elements. The three layers are divided among many different grid elements to allow the reservoir modeling method to provide meaningful results. If a fracture exists connecting layer 1 520 and layer 2 530, the fracture is incorporated into the three-dimensional grid at a location that corresponds to the actual location of the fracture within the reservoir. If appropriate, the fracture is specified along the boundary surfaces of adjacent grid elements. Permeability values of layers 1 520 and 2 530 and other reservoir properties are input and stored in the computer memory 130. After specifying the wellbore condition, fluxes across the boundary surfaces of each grid element are calculated and a solution including the cross flow flux profiles from Layer 1 520 to Layer 2 530 and well pressure and flow rate profiles are output.

Figure 6:
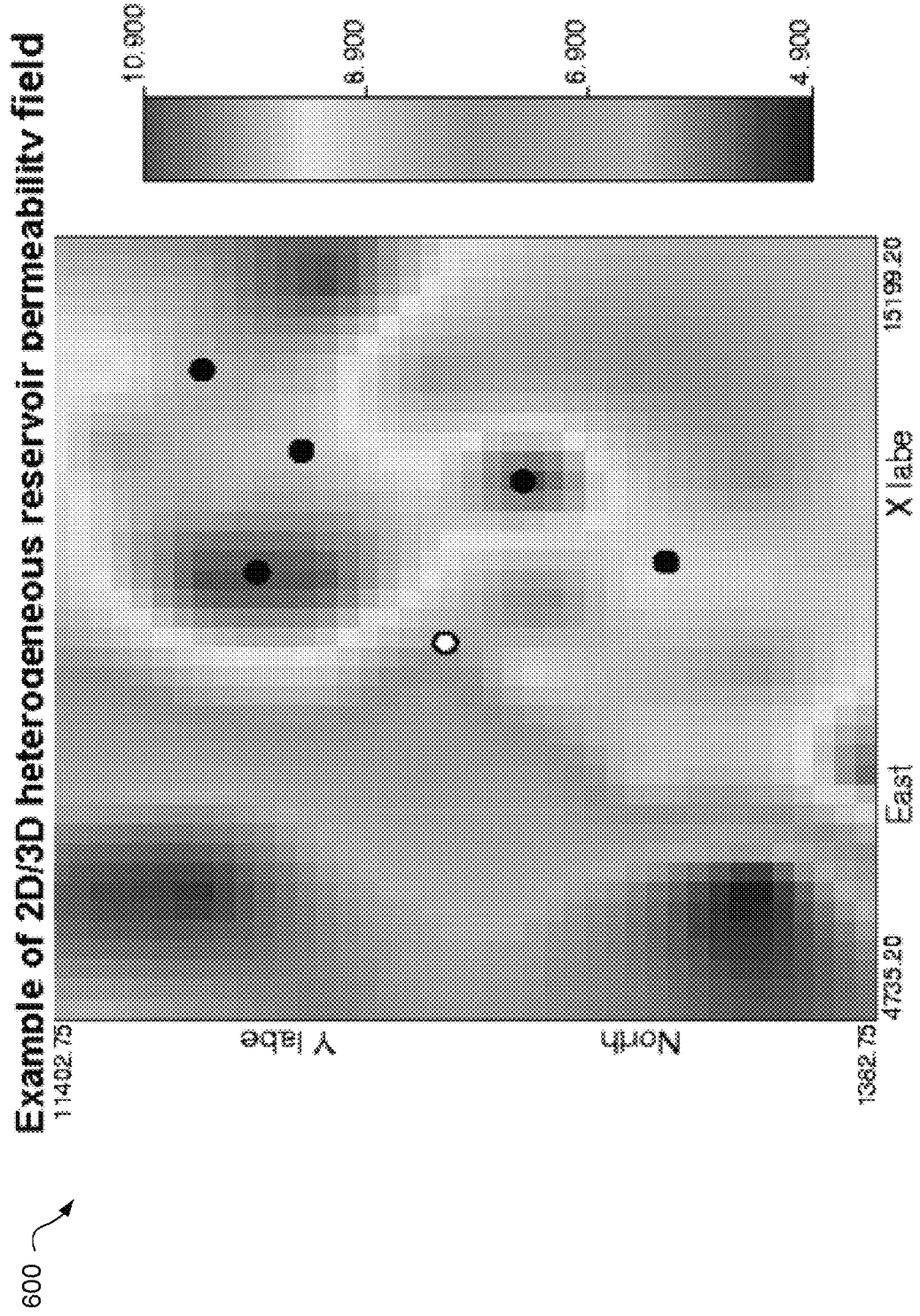
FIG. 6 is a graph showing an example of input for the reservoir modeling method of FIG. 2.

In another example, the method for modeling a reservoir is applied to a reservoir having information from a seismic survey. Geostatistics methods using seismic data, well logging and well core sample data are also applied to generate reasonable mappings of reservoir properties, as shown in FIG. 6. In this example, the method is applied as follows: the reservoir properties of FIG. 6 are input into each grid element of a three-dimensional grid representing the reservoir, fluxes across the boundary surfaces of the grid elements are then determined based on a selected reservoir type and wellbore condition. The fluxes calculated are then applied to the grid elements to calculate the corresponding well pressure/rate profiles. Inverse analysis is then performed to match actual well measurement data and characterize the reservoir by identifying sealing faults, reservoir boundaries, high/low permeability regions and other reservoir features.

Geostatistics offers various mappings of reservoir properties using different algorithms, such as Kriging, Ordinary Kriging, Co-Kriging and sequential simulation, for example. The method for modeling a reservoir provided herein may be used to evaluate the appropriateness of those mappings. A group of the most appropriate reservoir property mappings having less uncertainty is output.

Figure 7:
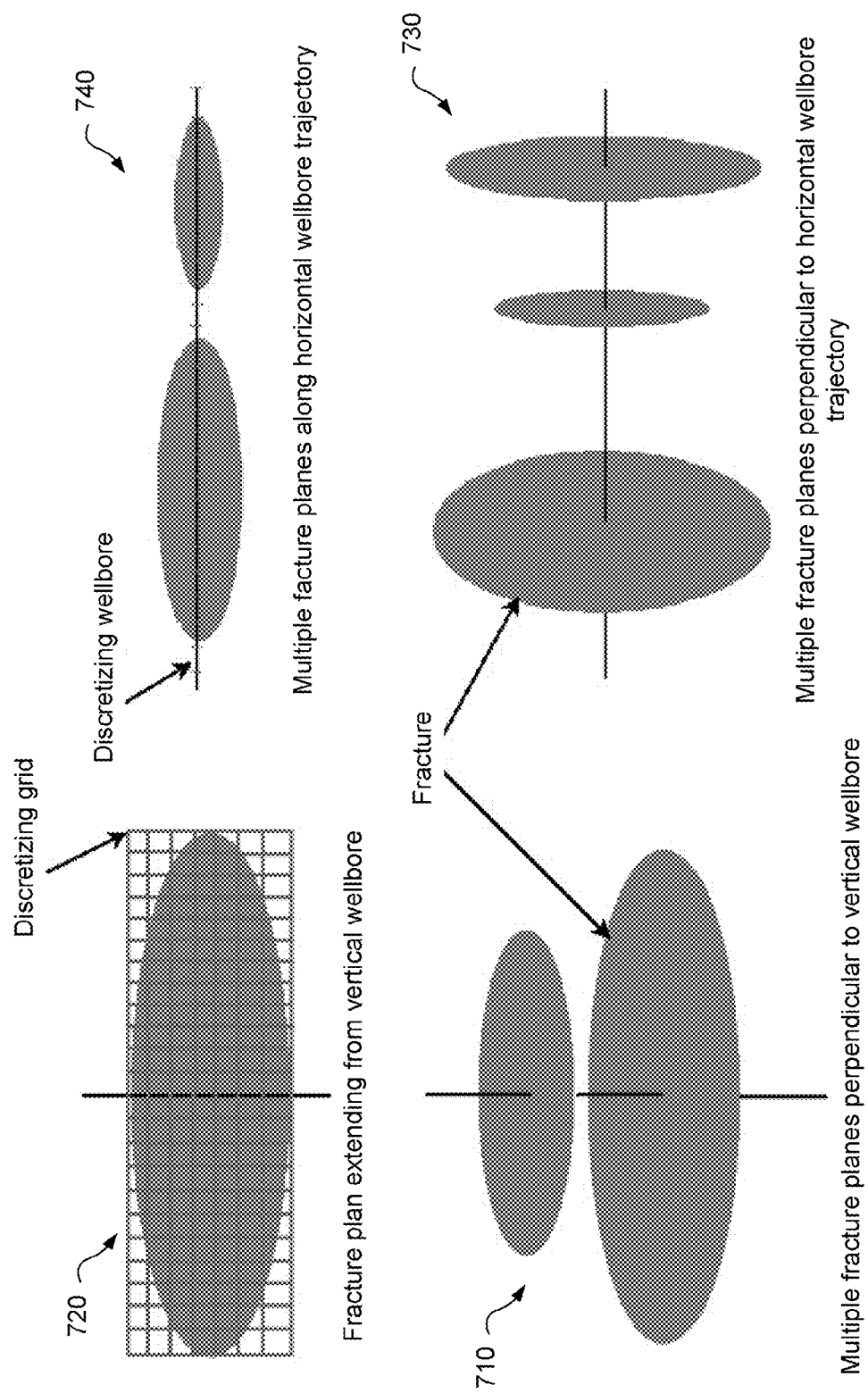
FIG. 7 includes schematic diagrams showing different types of hydraulically fractured wells.

In another example, the method for modeling a reservoir is applied to a hydraulically fractured well. The well may be a vertical well or a horizontal well. Referring to FIG. 7, the fracture system may be: one or more fracture planes that are perpendicular to the wellbore trajectory 710, a single fracture plane that is parallel to the wellbore trajectory 720, multiple fracture planes that are perpendicular to the wellbore trajectory 730, or multiple fracture planes that are parallel to the wellbore trajectory 740. In this example, the method for modeling a reservoir is applied by: discretizing the fracture plane and the wellbore as shown in FIG. 7, determining fluxes across each fracture plane and each boundary surface of discretized grid elements of a three-dimensional grid representing the reservoir and outputting well pressure rate profiles of the reservoir.

Figure 8:
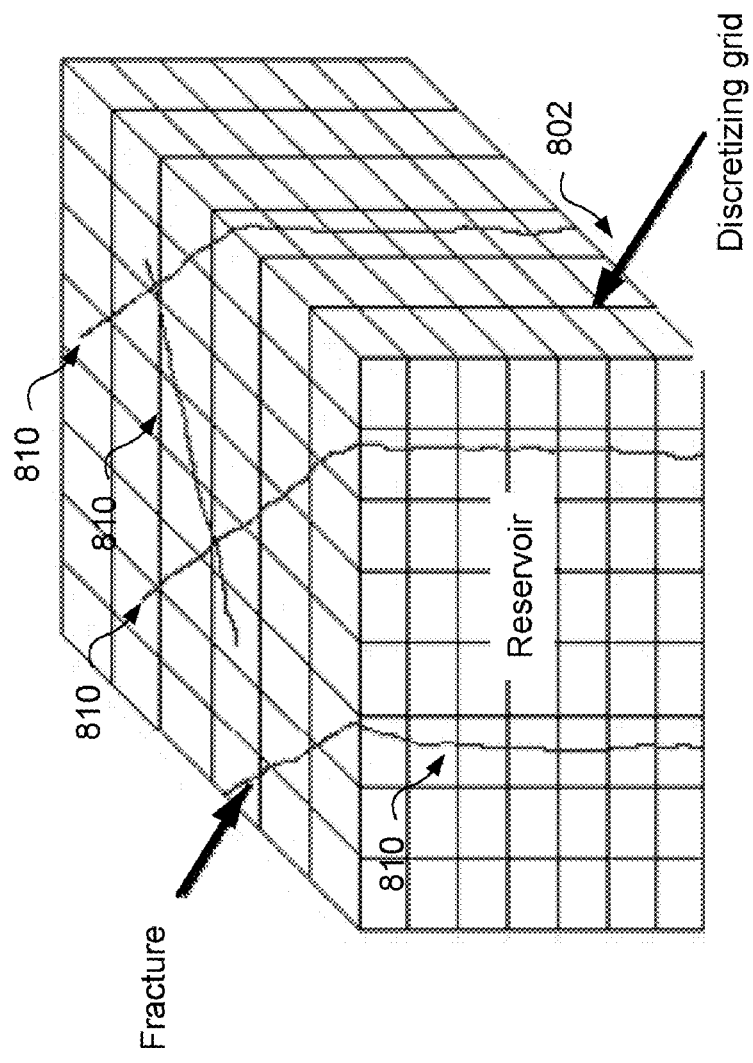
FIG. 8 is a schematic diagram showing a reservoir having a natural fracture system.

In another example, the method for modeling a reservoir is applied to a reservoir with a natural fracture system, as shown in FIG. 8. In this example, the method is applied as follows: the reservoir and natural fracture system 810 are discretized into a three-dimensional grid 802 and the natural fracture system is integrated into the reservoir model through the application of Green's function. The fracture plane is divided into subsurfaces in order to increase the solution accuracy. Fluxes across the natural fracture plane and the boundary surfaces of each grid element are calculated and well pressure/rate profiles are output.

Figure 9:
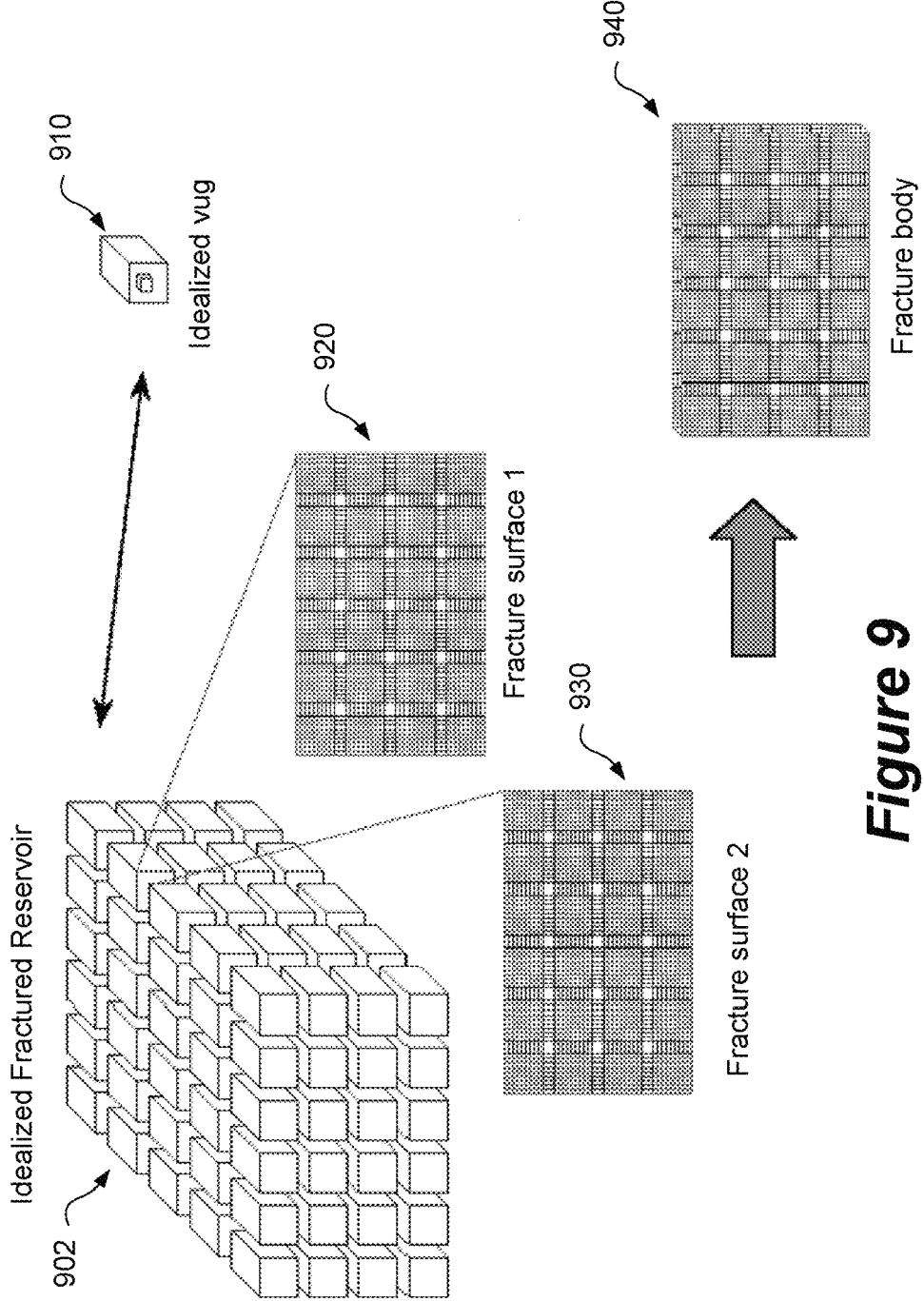
FIG. 9 is a schematic diagram showing Warren and Root's idealized fractured reservoir model (1963)

Referring to FIG. 9, in another example, the method for modeling a reservoir is applied to Warren and Root's idealized fractured reservoir model (1963), which includes an idealized natural fracture system and vugs (small to medium-sized cavities). Unlike Warren and Root's idealized fractured reservoir model, the method for modeling a reservoir of the present application allows different values to be assigned to each grid element and also allows for calculation of how much fluid is entering the fracture body. In this example, the method is applied as follows: the sugar-block like reservoir is discretized into a three-dimensional grid 902. The idealized orthogonal natural fracture system and the idealized vugs 904 are integrated into the reservoir model through the application of the source and sink function method. A discretized fracture body 940 is the space enclosed by adjacent confronting fracture surface 1 920 and fracture surface 2 930 and the assumed fracture planes surrounded, shown in FIG. 9. The fluxes on the two adjacent confronting fracture surfaces 1 920 and 2 930 represent the fluid transfer between fracture and matrix (i.e. rock body without fracture); while the fluxes of other surrounding planes of the fracture body represent fluid flow among adjacent discretized fracture bodies. Fluxes across the idealized natural fracture surfaces and the boundary surfaces of each discretized fracture body are calculated and well pressure/rate profiles are output.

In another example, the method for modeling a reservoir is applied to a multilateral well, as shown in FIG. 10. In this example, the method is applied as follows: the reservoir 1000 and multi-lateral well bore trajectory is discretized into a three-dimensional grid. Wellbore trajectory data is available from well drilling reports. The natural fracture system integrated as has been previously described and the multilateral well is expressed and incorporated using source and sink function method as shown. Inflow fluxes towards each lateral wellbore trajectory and fluxes across the boundary surfaces of each grid element are calculated and multilateral well pressure/rate profiles at a desired position are output.

Figure 11:
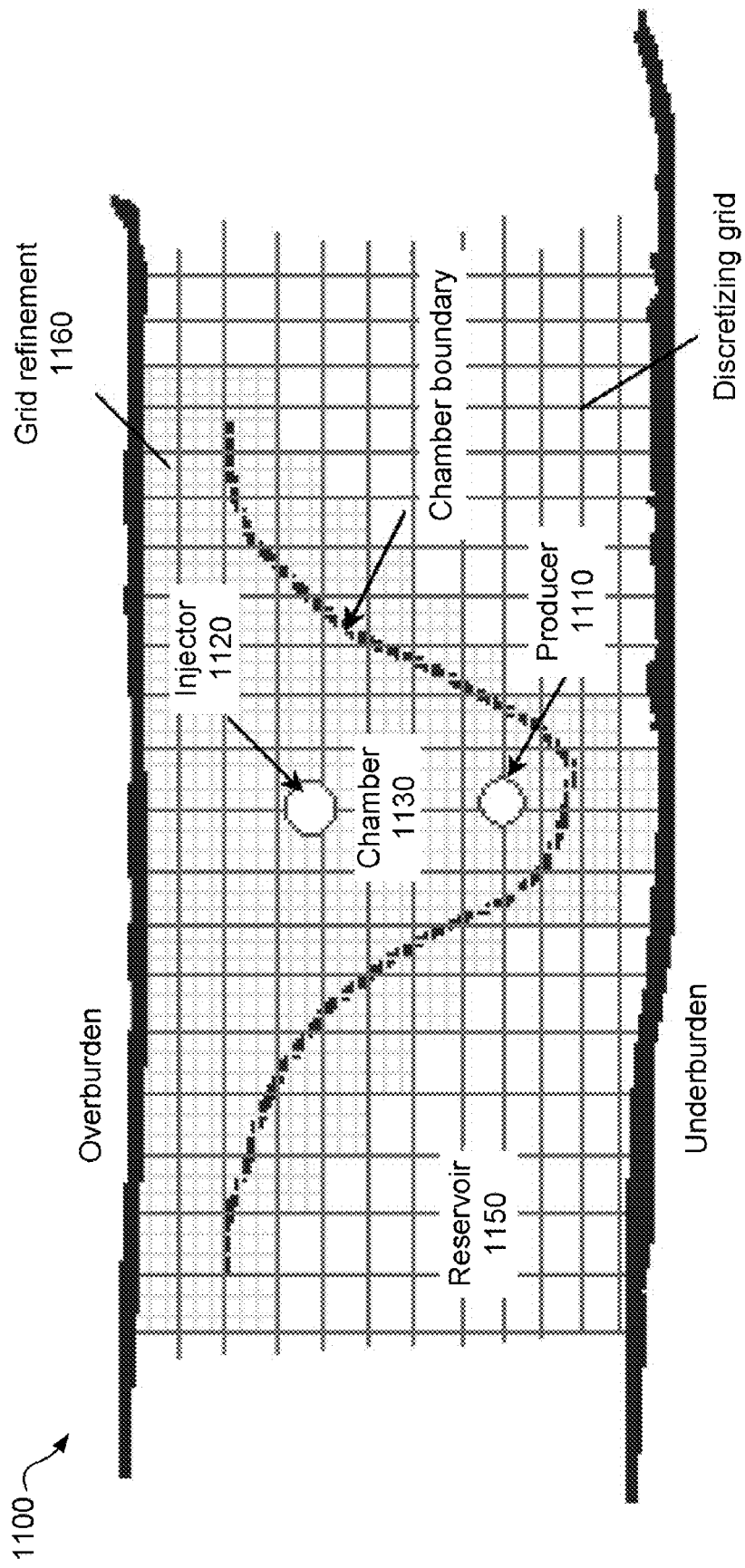
FIG. 11 is a schematic diagram showing a reservoir for modeling Steam Assist Gravity Drainage (SAGO) and solvent Vapor Extraction (Vapex) techniques.

In another example, the method for modeling a reservoir 1150 is applied to analyze Steam Assist Gravity Drainage (SAGO) and solvent Vapor Extraction (Vapex), as shown in FIG. 11. SAGO and Vapex are two practical heavy oil development technologies in which high temperature fluids, steam or solvent are injected into the reservoir. In this example, the method is applied as follows: the reservoir and the well pair consisting of producer 1110 and injector 1120 is discretized into a three-dimensional grid 1100. The producer and injector well pair may have different patterns such as across, parallel and perpendicular to each other. The well pair can be either vertical or horizontal wells. Wellbore trajectory is discretized and integrated into the three-dimensional grid. The grid elements of the three-dimensional grid may be further divided into sub-grid elements in order to refine the grid and improve solution accuracy, as shown in FIG. 11. For SAGO technology, potential domain and thermal domain are coupled simultaneously using source and sink function method. Grid refinement is used for the reservoir region around the well pair, i.e., the chamber 1130, particularly the region around the boundary of chamber. For Vapex technology, compositional simulation of hydrocarbon and solvent injected is incorporated in the model and thermal domain is coupled if necessary. Grid refinement 1160 is used for the chamber region and chamber boundary. Inflow fluxes towards the producer and fluxes across the boundary surfaces of each discretized grid element are calculated and well production rate profile and inflow influx profile along producer trajectory are output.

The following are equations for use in the method for modeling a reservoir of FIGS. 3 and 4.

A general dimensionless semi-analytical expression of potential form for boundary source/sink planes, commonly called fracture planes, can be presented in Laplace domain as:

$$\overline{\Delta P_m}(\chi, U, \xi) = \overline{q}_m(\xi) \cdot \overline{f}_m(\chi, U, \xi) \quad (1)$$

where,
m=1, 2, 3 stand for one-dimensional, two-dimensional and three-dimensional domains, respectively;
χ represents locations in m domain where potential change caused by plane source/sink will be evaluated;
ξ represent locations of source/sink plane, generally they are located on the faces of discretized grid element boundary surfaces;
U is time related Laplace transformation variable;
ΔP is potential change caused by source/sink plane;
q is flux of source/sink plane; and
f is the kernel function of source/sink plane in m domain.

A general dimensionless semi-analytical expression of potential form for different kinds of wells, such as vertical/slant well, horizontal well, multi-lateral smart well and fractured well, for example, can be presented in Laplace domain as:

$$\overline{\Delta P_{w,m}}(\chi, U, \psi) = \overline{q}_{w,m}(\psi) \cdot \overline{f}_{w,m}(\chi, U, \psi) \quad (2)$$

where,
w represents well; and
ψ represent wellbore locations, i.e., wellbore trajectory of different kinds of wells. It may be a single well, or a segment of discretized wellbore in m domain. The other symbols have been previously identified.

Assuming that a rectangular reservoir is discretized into $N_x$, $N_y$, $N_z$ grid elements in the x, y, and z directions in a Cartesian system and that boundary surfaces are discretized into sub-surfaces within each grid element: $N_{fx}$, $N_{fy}$, $N_{fz}$. Then, the semi-analytical reservoir model is built as the following. Within each of the discretized grid elements, Equation (1) is applied to evaluate at a sub-surface center the potential change caused by all sub-surface source/sink planes within a grid element; there are 2 sub-surface sides for m=1, 4 for m=2 and 6 for m=3 for each grid element.

Take a 3D discretized grid element for example, for a point within grid element (i,j,k), where $1 \leq i \leq N_x$, $1 \leq j \leq N_y$, $1 \leq k \leq N_z$. The mathematical expression of total potential change is:

$$\overline{\Delta P_m}(\chi, i, j, k) = \sum_{n=1}^{n=2m} \overline{\Delta P_m}(\chi, U, \xi_{n,nf}) + \sum_{o=1}^{O_n} \overline{\Delta P_{w,m}}(\chi, U, \psi_o) \quad (3)$$

or, using equations (1) and (2) to rewrite equation (3) as $$\overline{\Delta P_m}(\chi, i, j, k) = \quad (4)$$
$$\sum_{n=1}^{n=2m} \overline{q}_m(\xi_n) \cdot \overline{f}_m(\chi, U, \xi_{n,nf}) + \sum_{o=1}^{O_n} \overline{q}_{w,m}(\psi_o) \cdot \overline{f}_{w,m}(\chi, U, \psi_o)$$

Where n is the total number of boundary surfaces of a discretized grid element (i,j,k). N, is the total number of sub-surfaces within boundary surface n. $O_n$ is the total number of discretized well segments within grid element (i,j,k).

Equation (4) will then be applied for all discretized grid elements to generate the potential changes at central points of all sub-surfaces if the central points are not located inside a wellbore space, otherwise, the evaluation pOints need to be modified accordingly. There are $N_x \times N_y \times N_z$ grid elements in total. Eventually, equations will be established based on potential equilibrium and fluxes equality for the entire reservoir system.

Based on the simplified discretization scheme and uniform subgrid. The reservoir system with one vertical wellbore and without well bore discretization will be substantiated as:

$$AX = b \quad (5)$$

Where A, in general, is a structurally Block Toeplitz-like matrix with Toeplitz plus Hankel matrix elements for heterogeneous reservoir system. For a homogeneous reservoir system, A is a Block Toeplitz matrix with same Toeplitz plus Hankel matrix elements.

Figure 12:
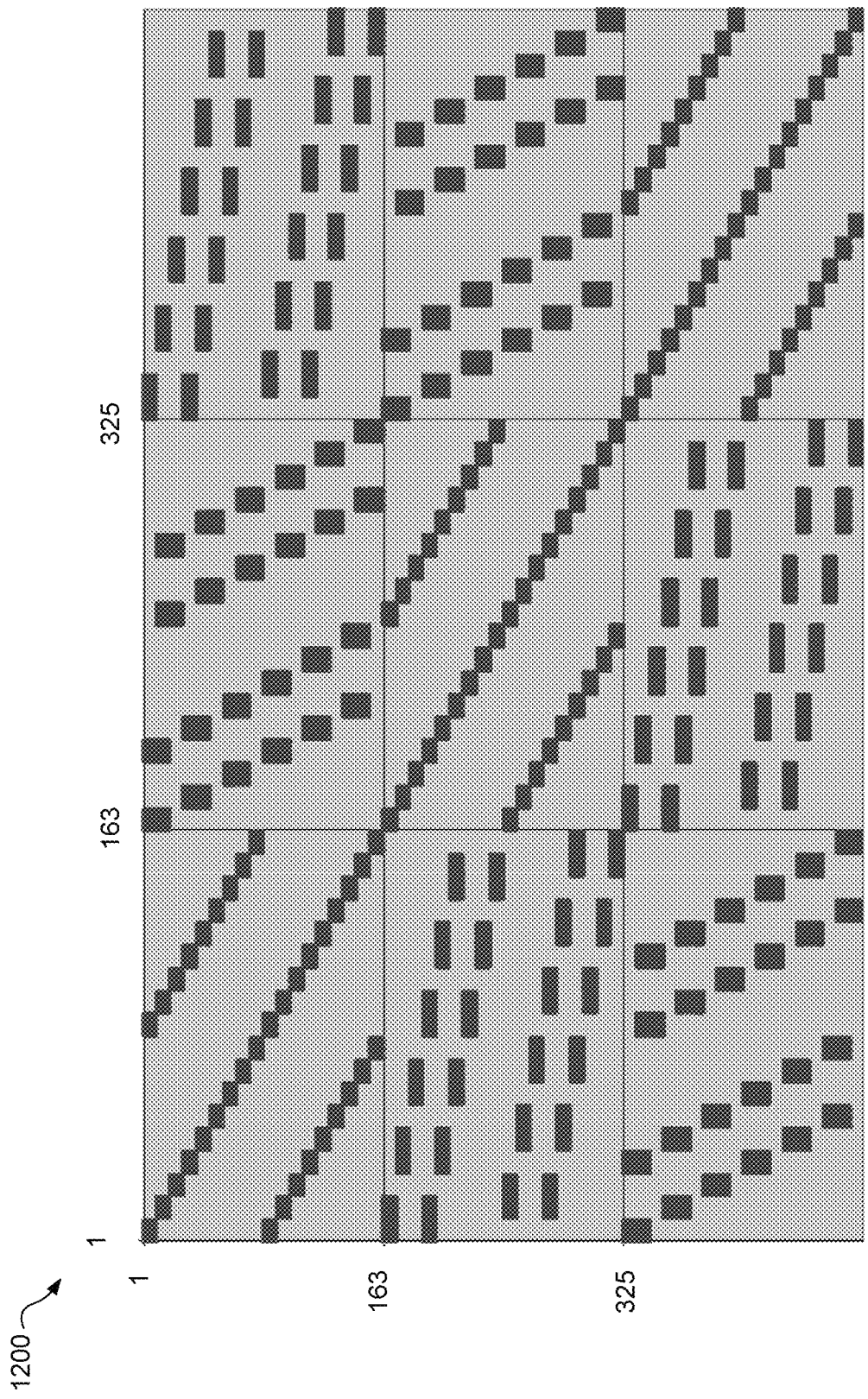
FIG. 12 is a schematic diagram showing a matrix format representation of the method.

Referring to FIG. 12, a representation 1200 of a matrix format under the condition of one vertical wellbore without wellbore discretization for a 3×3×3 discretization with 3×3 subgrid is shown. Other forms of matrix format are possible if the flux terms are arranged differently. Wellbore trajectory will change the matrix appearance depending on many factors including: the number of wells, the trajectories of the wells and the well bore boundary conditions.

In one embodiment, mathematical reservoir models are generated using the method for modeling a reservoir of FIGS. 3 and 4 to explore the response of idealized models.

Specific embodiments have been shown and described herein. However, modifications and variations may occur to those skilled in the art. All such modifications and variations are believed to be within the scope and sphere of the present disclosure.

The invention claimed is:

1. A method implemented in a computer processor for providing a three-dimensional model of a reservoir stored in memory as a reservoir data model, the memory coupled to the processor, the method comprising:
dividing the reservoir data model into a plurality of three dimensional $N_x \times N_y \times N_Z$ grid elements, each of the grid elements being delimited by boundary surfaces;
storing reservoir properties associated with each of the plurality of grid elements of the divided reservoir data model in the memory;
dividing boundary surfaces of each of the plurality of grid elements into sub-surfaces;
determining fluxes across each of the sub-surfaces of each of the plurality of grid elements in the Laplace domain, the fluxes being calculated based on a type of reservoir of the reservoir model; and
applying the determined fluxes to each of the grid elements to provide pressure and production status throughout the reservoir data model.

2. The method of claim 1 wherein determining fluxes across each of the sub-surfaces of each of the plurality of grid elements further comprises:
selecting a Green's function associated with the type of reservoir of the reservoir model;
applying the selected Green's function to each sub-surface of the plurality of grid elements to determine pressure changes at any location within the respective grid element;
determining potential and flux equilibrium between adjacent grid elements to generate a linear system;
solving the linear system using a sparse Block-Toeplitz matrix as the main feature to determine fluxes of boundary surfaces and flux profiles along a defined well trajectory defined within the reservoir model;
finalizing pressure and production status at desired locations with the reservoir data model using a corresponding wellbore condition, fluxes of sub-surfaces and a flux profile along the defined wellbore trajectory.

3. The method of claim 1 wherein calculating fluxes at boundary source/sink planes are presented in Laplace domain as:

$$\overline{\Delta P_m}(\chi, U, \xi) = \overline{q}_m(\xi) \cdot \overline{f}_m(\chi, U, \xi)$$

where,
m=1, 2, 3 stand for one-dimensional, two-dimensional and three-dimensional domains, respectively;
$\chi$ represents locations in m domain where potential change caused by plane source/sink will be evaluated;
$\xi$ represent locations of source/sink plane, generally they are located on the faces of discretized grid element boundary surfaces;
U is time related Laplace transformation variable;
$\Delta P$ is potential change caused by source/sink plane;
q is flux of source/sink plane; and
f is the kernel function of source/sink plane in m domain.

4. The method of claim 1 wherein calculating fluxes at well bores are presented in Laplace domain as:

$$\overline{\Delta P_{w,m}}(\chi, U, \psi) = \overline{q}_{w,m}(\psi) \cdot \overline{f}_{w,m}(\chi, U, \psi)$$

where,
m=1, 2, 3 stand for one-dimensional, two-dimensional and three-dimensional domains, respectively;
$\chi$ represents locations in m domain where potential change caused by plane source/sink will be evaluated;
$\xi$ represent locations of source/sink plane, generally they are located on the faces of discretized grid element boundary surfaces;
U is time related Laplace transformation variable;
$\Delta P$ is potential change caused by source/sink plane;
q is flux of source/sink plane;
f is the kernel function of source/sink plane in m domain;
w represents well; and
$\psi$ represent wellbore locations.

5. The method of claim 2 wherein wellbore conditions include constant rate and constant wellbore pressure.

6. The method of claim 1, wherein the fluxes are applied to the grid elements to provide temperature status throughout the reservoir at the sub-surfaces and grid boundary.

7. The method of claim 1, wherein the reservoir type is one of: an infinite reservoir, a semi-infinite reservoir, a reservoir having no-flow boundaries, a constant pressure reservoir and a reservoir having constant rate boundaries.

8. The method of claim 1, wherein the fluxes across each of the boundary surfaces of each of the grid elements are calculated once for grid elements having identical reservoir properties.

9. The method of claim 1, wherein a reservoir having at least one of: crossflow, a hydraulically fractured well, a multilateral well and a natural fracture system is modeled.

10. The method of claim 1, wherein the method is applied to analyze Steam Assist Gravity Drainage (SAGO) and solvent Vapor Extraction (Vapex).

11. The method of claim 1, wherein Warren and Root's idealized fractured reservoir model is modeled.

12. The method of claim 1 wherein a rectangular reservoir is discretized into $N_x$, $N_y$, $N_z$ grid elements in the x, y, and z directions in a Cartesian system and that boundary surfaces are discretized into sub-surfaces within each grid element: $N_{fx}$, $N_{fy}$, $N_{fz}$.

13. The method of claim 9 wherein the reservoir with one vertical wellbore and without wellbore discretization is be substantiated as:

$$AX = b$$

where A, in general, is a structurally Block Toeplitz-like matrix with Toeplitz plus Hankel matrix elements for heterogeneous reservoir system.

14. The method of claim 13 wherein for a homogeneous reservoir system, A is a Block Toeplitz matrix with same Toeplitz plus Hankel matrix elements.

15. The method of claim 1, wherein the pressure status throughout the reservoir is applied to determine a more accurate reservoir permeability and porosity field mapping using inverse analysis using finalizing pressure and production status.

16. The method of claim 1 wherein the reservoir properties are defined by one or more properties selected from the group comprising reservoir rock permeability, porosity, rock and fluid compressibility, viscosity, reservoir rock geometry, fracture systems contained inside, fault parameters, temperature, and pressure.

17. A computer readable memory containing instructions for generating a three-dimensional model of a reservoir as a reservoir data model, the instructions when executed by a processor performing the method of:
dividing the reservoir data model into a plurality of three dimensional $N_x \times N_y \times N_Z$ grid elements, each of the grid elements being delimited by boundary surfaces;
storing reservoir properties associated with each of the plurality of grid elements of the divided reservoir data model in the memory;
dividing boundary surfaces of each of the plurality of grid elements into sub-surfaces;
determining fluxes across each of the sub-surfaces of each of the plurality of grid elements in the Laplace domain, the fluxes being calculated based on a type of reservoir of the reservoir model; and
applying the determined fluxes to each of the grid elements to provide pressure and production status throughout the reservoir data model.

18. A system for generating a three-dimensional model of a reservoir as a reservoir data model, the system comprising:
a processor;
a memory containing instructions, which when executed by the processor perform:
dividing the reservoir data model into a plurality of three dimensional $N_x \times N_y \times N_Z$ grid elements, each of the grid elements being delimited by boundary surfaces;
storing reservoir properties associated with each of the plurality of grid elements of the divided reservoir data model in the memory;
dividing boundary surfaces of each of the plurality of grid elements into sub-surfaces;
determining fluxes across each of the sub-surfaces of each of the plurality of grid elements in the Laplace domain, the fluxes being calculated based on a type of reservoir of the reservoir model; and
applying the determined fluxes to each of the grid elements to provide pressure and production status throughout the reservoir data model.

* * * * *